(12) United States Patent
Zhang

(10) Patent No.: US 8,474,149 B2
(45) Date of Patent: Jul. 2, 2013

(54) CONCENTRICITY TEST DEVICE

(75) Inventor: Bing-Jun Zhang, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 194 days.

(21) Appl. No.: 13/206,539

(22) Filed: Aug. 10, 2011

(65) Prior Publication Data

US 2012/0266474 A1    Oct. 25, 2012

(30) Foreign Application Priority Data

Apr. 21, 2011  (CN) .......................... 2011 1 0099768

(51) Int. Cl.
*G01B 5/20*    (2006.01)

(52) U.S. Cl.
USPC .................................. 33/550; 33/520; 33/543

(58) Field of Classification Search
USPC .................................. 33/520, 550, 543, 555.1
See application file for complete search history.

(56) References Cited

U.S. PATENT DOCUMENTS

| | | | | |
|---|---|---|---|---|
| 4,679,330 | A * | 7/1987 | Williams | 33/550 |
| 5,095,634 | A * | 3/1992 | Overlach et al. | 33/548 |
| 5,485,678 | A * | 1/1996 | Wagg et al. | 33/610 |
| 7,458,168 | B2 * | 12/2008 | Furukawa | 33/543 |
| 7,461,463 | B1 * | 12/2008 | Livingston | 33/550 |
| 7,748,134 | B1 * | 7/2010 | Wang | 33/551 |
| 2007/0180721 | A1 * | 8/2007 | Furukawa | 33/543 |
| 2012/0266474 | A1 * | 10/2012 | Zhang | 33/550 |

* cited by examiner

*Primary Examiner* — Yaritza Guadalupe-McCall
(74) *Attorney, Agent, or Firm* — Altis Law Group, Inc.

(57) ABSTRACT

A test device for testing whether an axis of a first portion of an article is coaxial with an axis of a second portion of the article includes a supporting member, a benchmark member fixed to a first end of the support member, and a test member slidably received in a second end of the supporting member opposite to the first end. The benchmark member includes a first test portion to position the first portion of the article that are coaxial within a coaxial tolerance. The test member includes a second test member coaxial with the first test portion. If the second portion is capable of being positioned to the second test portion, the article is qualified. If the second portion is incapable positioned to the second test portion, the article is unqualified.

12 Claims, 6 Drawing Sheets

CONCENTRICITY TEST DEVICE

BACKGROUND

1. Technical Field

The present disclosure relates to test devices, and particularly, to a device for testing concentricity between axes of two through holes.

2. Description of Related Art

In device machining, a number of through holes are often defined in the devices, and a number of columns protrude from the devices. In many cases, to ensure that a coaxial tolerance between opposite through holes or opposite columns meets specifications, a three-dimensional measuring device is usually employed for measuring the coaxial tolerance. However, using the three-dimensional measuring device is time-consuming, which cannot satisfy mass-production.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

The present disclosure, including the accompanying drawings, is illustrated by way of examples and not by way of limitation. It should be noted that references to "an" or "one" embodiment in this disclosure are not necessarily to the same embodiment, and such references mean at least one.

Figure 1:
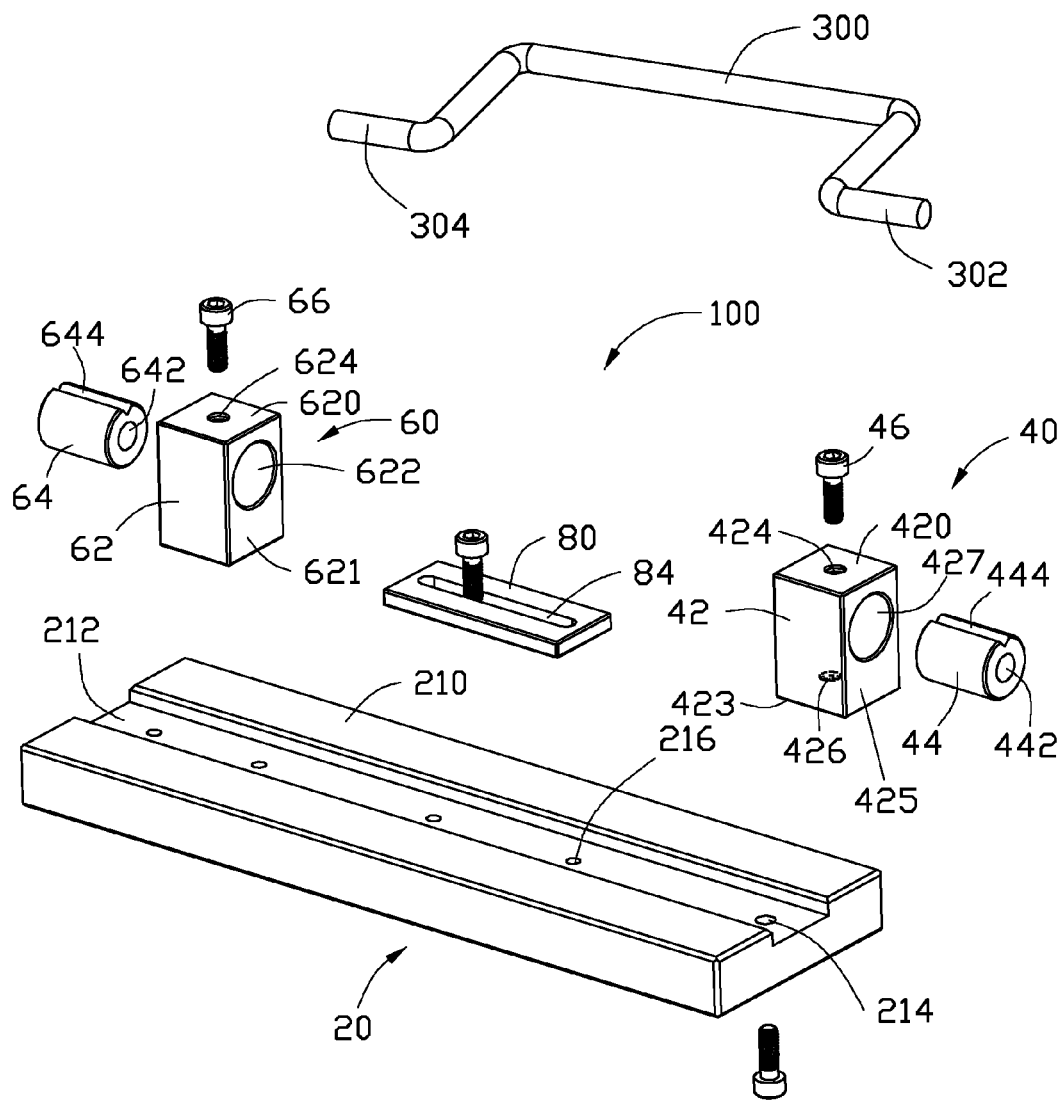
FIG. 1 is an exploded, isometric view of a first exemplary embodiment of a test device, together with an article, wherein the test device includes a measurement portion.

Referring to FIG. 1, a first embodiment of a test device 100 is provided for testing whether an axis of a first portion 302 of an article 300 is coaxial with an axis of a second portion 304 of the article 300. In this embodiment, the article 300 includes a substantially U-shaped main body, and the first portion 302 and the second portion 304 perpendicularly extending out from opposite ends the main body. The first portion 302 is cylindrical. The second portion 304 is cylindrical, and aligns with the first portion 302. The test device 100 includes a supporting member 20, a benchmark member 40, a test member 60, and a mounting member 80.

The supporting member 20 is a substantially rectangular plate, and includes a rectangular top surface 210. A elongate slide slot 212 is longitudinally defined in a middle of the top surface 210. Two opposite ends of the slide slot 212 extend through two corresponding end surfaces of the supporting member 20, respectively. A first end of a bottom wall of the slide slot 212 defines a through hole 214. A plurality of screw holes 216 are defined in the bottom wall of the slide slot 212, extending through a bottom surface of the supporting member 20 opposite to the top surface 210.

The benchmark member 40 includes a rectangular positioning block 42, a cylindrical first test portion 44, and a screw 46.

The positioning block 42 includes a substantially rectangular top surface 420, a bottom surface 423 opposite to the top surface 420, and two opposite side surfaces 425 connected between corresponding sides of the top surface 420 and the bottom surface 423. A circular first receiving hole 427 is defined in the positioning block 42, extending through the side surfaces 425. A screw hole 424 is defined in a middle of the top surface 420, communicating with the first receiving hole 427. A fastening hole 426 is defined in the bottom surface 423.

The first test portion 44 is columnar, and axially defines a first aligning hole 442. A diameter of the first aligning hole 442 is equal to a diameter of the first portion 302. A substantially V-shaped first latching slot 444 is longitudinally defined in a circumference of the first test portion 44, parallel to the axis of the first aligning hole 442.

The test member 60 includes a rectangular sliding block 62, a cylindrical second test portion 64, and a screw 66.

The sliding block 62 includes a substantially rectangular top surface 620, and two opposite side surfaces 621 perpendicularly extending down from opposite sides of the top surface 620. A circular second receiving hole 622 is defined in the sliding block 62. A screw hole 624 is defined in a middle of the top surface 620, communicating with the second receiving hole 622.

The second test portion 64 is columnar, and axially defines a second aligning hole 642. A diameter of the second aligning hole 642 is equal to a diameter of the second portion 304. A substantially V-shaped second latching slot 644 is longitudinally defined in a circumference of the second test portion 64, parallel to the axis of the second aligning hole 642.

The mounting member 80 is a substantially rectangular plate, and longitudinally defines a long fixing slot 84.

Figure 2:
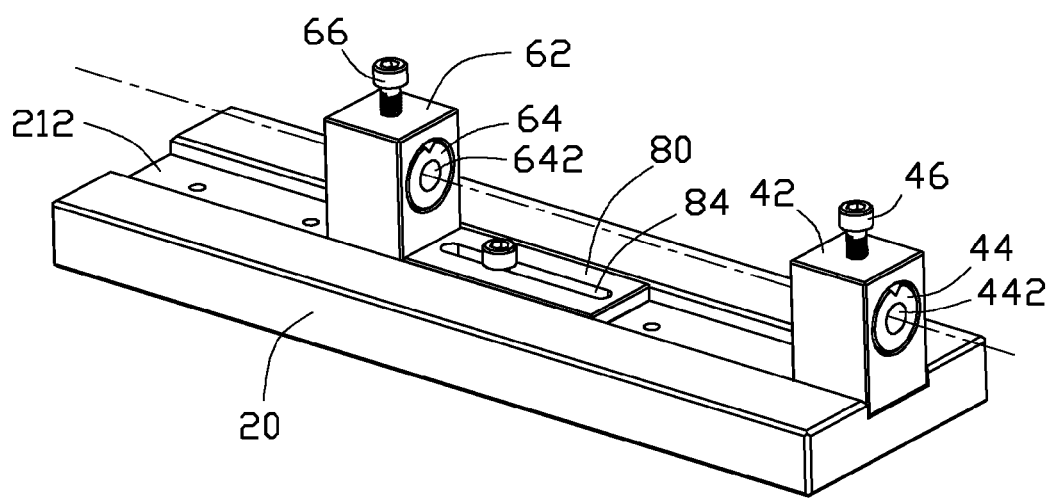
FIG. 2 is an assembled, isometric view of the test device of FIG. 1.

Referring to FIG. 2, in assembly, the first test portion 44 is received in the first receiving hole 427. The first latching slot 444 faces the screw hole 424. The screw 46 extends through the screw hole 424, to engage in the first latching slot 444. The positioning block 42 is received in the slide slot 212. The bottom surface 423 is supported on the bottom wall of the slide slot 212. The fastening hole 426 aligns with the through hole 214. A screw extends through the through hole 214, to screw in the fastening hole 426. The benchmark member 40 is fixed to the first end of the supporting member 20.

The second test portion 64 is received in the second receiving hole 622. The second latching slot 644 faces the screw hole 624. The screw 66 extends through the screw hole 624, to engage in the second latching slot 644. The second test portion 64 is fixed to the sliding block 62. The lower portion of the sliding block 62 is slidably received in the slide slot 212. The mounting member 80 is received in the slide slot 212 between the benchmark member 40 and the test member 60. A screw extends through the fixing slot 84, to screw in a corresponding screw hole 216 of the supporting member 20. The position of the mounting member 80 can be adjusted to make the mounting member 80 resist against the sliding block 62, thereby positioning the sliding block 62. The axis of the first aligning hole 442 is coaxial with the axis of the second aligning hole 642, within a coaxial tolerance.

Figure 3:
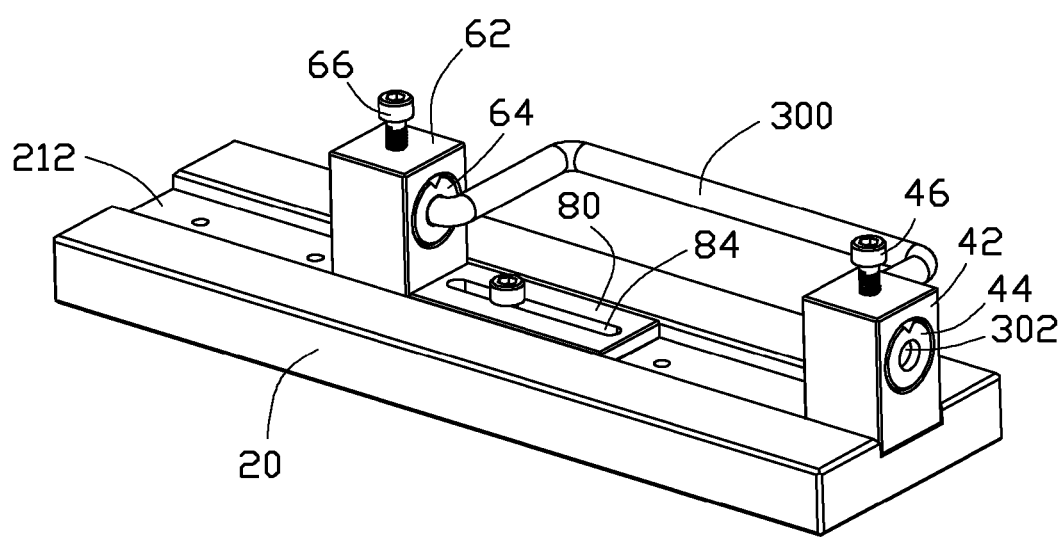
FIG. 3 is an assembled, isometric view of the test device in measuring the article of FIG. 1.
Figure 4:
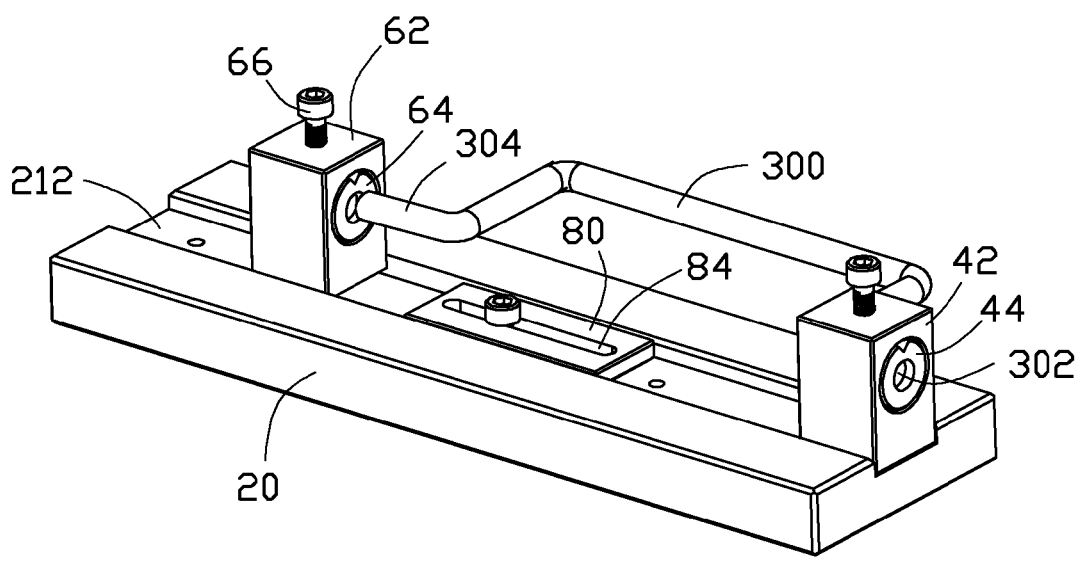
FIG. 4 is similar to FIG. 3, but shows a different state of use.

Referring to FIGS. 3 to 4, in use, the test member 60 and the mounting member 80 are adjusted, making the distance between the benchmark member 40 and the test member 60 slightly greater than the distance between distal ends of the first portion 302 and the second portion 304. The first portion 302 of the article 300 is positioned to the benchmark member 40 by being inserted into the first aligning hole 442 of the benchmark member 40. The test member 60 is moved toward the second portion 304 of the article 300. If the second portion 304 of the article 300 is capable of being positioned to the test member 60 by being inserted into the second aligning hole 642 of the test member 60, the article 300 is qualified. If the second portion 304 of the article 300 cannot be inserted into the second aligning hole 642 of the test member 60, the article 300 is unqualified.

Figure 5:
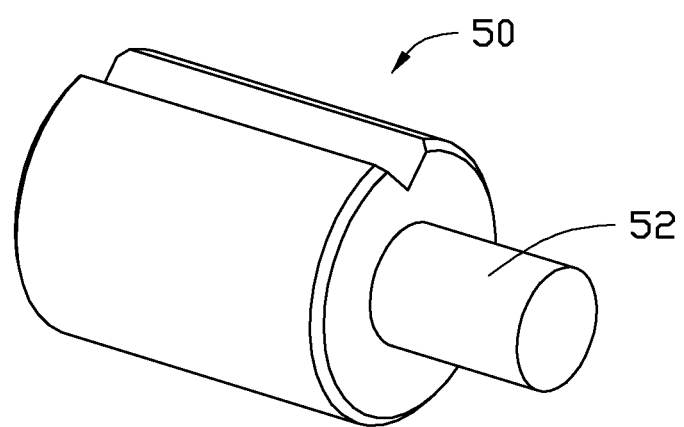
FIG. 5 is an enlarged, isometric view of a second exemplary embodiment of a measurement portion of a test device.
Figure 6:
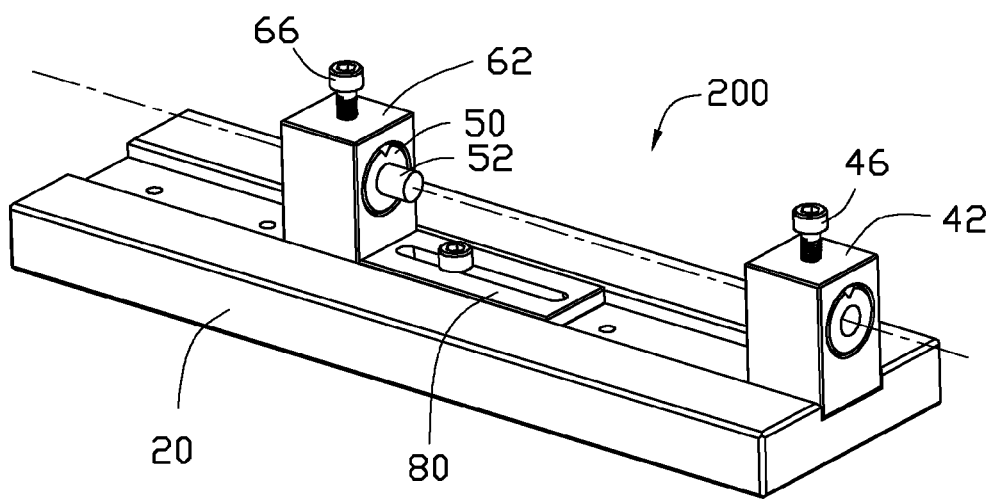
FIG. 6 is an assembled, isometric view of a second exemplary embodiment of the test device.

Referring to FIGS. 5 to 6, a second embodiment of a test device 200 is provided for testing whether an axis of a first hole of an article is coaxial with an axis of a second hole of the article. The second embodiment of the test device 200 is substantially similar to the first embodiment of the test device 100, except that the first and second test portions 44 and 64 of the first embodiment are replaced by two test portions 50. Each test portion 50 is columnar, with a columnar locating rod 52 axially extending from an end of the test portion 50. A diameter of the locating rod 52 is equal to the diameters of the first and second holes. If the locating rods 52 can enter the first and second holes, respectively, the article is qualified. If one of the locating rods 52 cannot enter the corresponding one of the first and second holes, the article is unqualified.

It is to be understood, however, that even though numerous characteristics and advantages of the embodiments have been set forth in the foregoing description, together with details of the structure and function of the embodiments, the present disclosure is illustrative only, and changes may be made in details, especially in matters of shape, size, and arrangement of parts within the principles of the embodiments to the full extent indicated by the broad general meaning of the terms in which the appended claims are expressed.

What is claimed is:

1. A test device for testing whether an axis of a first portion of an article is coaxial with an axis of a second portion of the article, the test device comprising:
   a supporting member;
   a benchmark member fixed to a first end of the support member, the benchmark member comprising a first test portion to position the first portion; and
   a test member slidably mounted to a second end of the support member opposite to the first end, and the test member operable to slide toward or away from the benchmark member, the test member comprising a second test portion to position the second portion;
   wherein a central line of the first test portion is coaxial with a central line of the second test portion, within a coaxial tolerance, and wherein after the first portion is positioned to the first test portion, the test member is moved toward the benchmark member, if the second portion is capable of being positioned to the second test portion, the article is qualified, if the second portion is incapable of being positioned to the second test portion, the article is unqualified.

2. The test device of claim 1, wherein the supporting member is a substantially rectangular plate, and comprises a top surface longitudinally defining a long slide slot, the benchmark member is fixed to a first end of the slide slot, the test member is slidably received in a second end of the slide slot.

3. The test device of claim 2, wherein the benchmark member comprises a positioning block fixed to the first end of the slide slot, a first receiving hole is defined in the positioning block, and the first test portion is received in the first receiving hole.

4. The test device of claim 3, wherein the positioning block defines a first screw hole, communicating with the first receiving hole, a first screw extends through the first screw hole, to engage with the first test portion.

5. The test device of claim 4, wherein the first test portion is columnar, a first latching slot is longitudinally defined in a circumference of the first test portion, the first screw is engaged in the first latching slot.

6. The test device of claim 2, wherein the test member further comprises a sliding block slidably received in the second end of the slide slot, a second receiving hole is defined in the sliding block, and the second test portion is received in the second receiving hole.

7. The test device of claim 6, wherein the sliding block defines a second screw hole, communicating with the second receiving hole, a second screw extends through the second screw hole, to engage with the second test portion.

8. The test device of claim 7, wherein the second test portion is columnar, a second latching slot is longitudinally defined in a circumference of the second test portion, the second screw is engaged in the second latching slot.

9. The test device of claim 2, further comprising a mounting member fixed in the slide slot, between the benchmark member and the test member, to position the test member.

10. The test device of claim 9, wherein the mounting member longitudinally defines a long fixing hole, a plurality of screw holes are defined in the bottom wall of the slide slot, a screw extends through the fixing slot to screw in one of the screw holes.

11. The test device of claim 1, wherein each of the first and second test portions is cylindrical, and axially defines an aligning hole to receive a corresponding one of the first and second portions of the article for positioning the article if the first and second portions are columnar, a diameter of the aligning hole is equal to the diameter of a corresponding one of the first and second test portions, the aligning hole of the first test portion is coaxial with the aligning hole of the second test portion.

12. The test device of claim 1, wherein each of the first and second test portions comprises a cylindrical locating rod axially protrudes from an end of the test portion to enter a corresponding one of the first and second portions of the article for positioning the article if the first and second portions are holes, a diameter of the locating rod is equal to a diameter of the hole.

* * * * *